United States Patent Office 3,242,032
Patented Mar. 22, 1966

3,242,032
GLASS SPHERES AND UNDERGROUND PROPPANTS AND METHODS OF MAKING THE SAME
Charles W. Schott, 4769 Barone Drive, Pittsburgh 27, Pa.
No Drawing. Filed Nov. 24, 1961, Ser. No. 154,881
6 Claims. (Cl. 161—1)

This application is a continuation-in-part of my copending application Serial No. 804,593, filed April 7, 1959.

This invention relates to glass spheres and underground proppants and methods of making the same and particularly to high strength spheres of glass.

There has long been a demand for high strength spheres of glass for use as packing material for chemical reaction towers, as porous load supporting beds, as corrosion resistant rollers and for various other purposes. There has in addition been a very real need for an underground proppant for use in oil and gas wells and the like to provide a path of fluid flow in a fractured formation. Various materials have been used with varying degrees of success. For example, graded sand has been used but it lacks sphericity and has no strength in larger sizes. Walnut shells and aluminum shot have been used but they tend to flatten out. Glass spheres have heretofore been made in various ways but the products have always lacked the property of high strength. Such spheres in the form of solid non-porous spheres have generally had compressive strengths less than 10,000 lbs. per square inch and accordingly were of limited usefulness. Due to this compressive strength limitation, such prior spheres were never seriously considered for underground proppant uses. In the form of cellular spheres with an imperforate outer shell, such materials and little or no strength.

I have discovered an underground proppant and method of producing solid bodies of glass having generally spherical shape, compressive strengths in excess of 50,000 lbs. per square inch, and as high as 450,000 lbs. per square inch, and adapted for use as underground proppants.

I have found that solid spheres of glass having the high strength needed for underground proppant uses can be produced by heating glass particles in a moving bed of carbonaceous material to a temperature in excess maintained at about 1000° C. to cause particle surface conditions of incipient fusion, then quenching the particles from a temperature above about 650° C. in a fluid to form glass spheres. I have found that the quenching fluid may be a liquid having a viscosity greater than water, but that water alone cannot be used.

It is important that the moving bed of carbonaceous material not be combusted during the heating operation since it would result in sticking together of the glass particles. In addition, combustion of the carbonaceous material would prevent the ability to recycle the carbonaceous material. For these reasons, a carbonaceous material having a low chemical reactivity rate (such as acetylene black) is required. Further, it is necessary to operate the apparatus under conditions that permit only a minimum of air leakage into the heating zone thereby permitting no substantial combustion of the carbonaceous material.

I have found that the higher the temperature from which the glass is quenched the higher the compressive strength will be. I have found that for high strength materials it is necessary to quench from a temperature not less than 650° C. I have found that glasses may be air quenched to temperatures approaching 650° C. and then finally quenched according to the practices of my invention and obtain the high strengths characteristic of my invention. For example, glasses quenched from 1000° C. by dropping through air to a temperature of 675° C. and then into oil at room temperature will have a higher strength than identical spheres which are treated by conventional air quenching practices. Such spheres will have the high strengths and resistance to crushing which is necessary for underground proppants.

The practice of my invention will be more fully understood by reference to the following example:

Ordinary lime-soda-silicate glass was crushed and graded to produce a fraction between ¼" and 20 mesh. This fraction was mixed in the proportions of 2000 grams of glass and 320 grams of acetylene black. This mixture was heated in a moving bed kiln to a temperature of 1000° C. until the glass particles became spherical. The acetylene black and glass particles were discharged into a bath of 100% ethylene glycol at room temperature after 2 feet of free fall in air. The glass spheres were recovered after reaching room temperature. The glass spheres were tested under compression and found to have an average compressive strength of about 98,000 lbs. per square inch. These tests were made by placing

Table

| Formation | Depth Equivalent, Over burden Pressure (p.s.i.) | Type | Size U.S. Series Mesh | Concentration | | Fracture Flow Capacity (md-ft.) | Remarks |
|---|---|---|---|---|---|---|---|
| | | | | Particles per sq. in. | Lb./Gal in Fracture | | |
| Aux Vases Sand | 3,000 | Sand | 10-20 | 125 | 6.0 | 17,000 | Moderately embedded, Slightly crushed. |
| | | do | 8-12 | 64 | 6.0 | 8,000 | Moderately embedded, moderately crushed. |
| | | Rounded walnut shells. | 6-8 | 10 | 0.8 | 20,000 | Slightly embedded, Slightly pancaked. |
| | | Glass spheres | 6-8 | 31 | 5.9 | 118,000 | Moderately embedded, Very slightly crushed. |
| | | Sand | 4-6 | 15 | 6.0 | 10,000 | Moderately embedded, Very severely crushed. |
| | | Rounded walnut shells. | 4-6 | 5 | 0.8 | 25,000 | Moderately embedded, Slightly pancaked. |
| Connell Sand | 6,000 | Ottawa Sand | 10-20 | Monolayer pack | | 700 | Slightly embedded, Severely crushed. |
| | | Dowell Sand | 8-12 | do | | <100 | Do. |
| | | Rounded Walnut shells. | 8-12 | 20 | 0.8 | 13,000 | Slightly embedded, Moderately pancaked. |
| | | Aluminum pellets. | 8-12 | 20 | | 48,000 | Do. |
| | | Glass spheres | 8-12 | 44 | 4.0 | 116,500 | Slightly embedded, Very slightly crushed. | the spheres between two hardened steel plates (Rockwell C hardness of 25) and exerting a force on the plates so that there was essentially point contact on the spheres.

These spheres were divided into three groups having size and strength properties as follows:

| Mesh size: | Average compressive strength, p.s.i. |
|---|---|
| 6 to 8 | 105,207 |
| 8 to 12 | 98,419 |
| 12 to 20 | 90,378 |

The spheres were then placed in laboratory flow cells constructed from typical well strata and compared with conventional proppants in the same strata. The results of fracture flow capacity tests and other comparative physical data are set out in the preceding table.

The foregoing table shows that the proppant of this invention permits a fracture flow capacity far greater than any of the conventional proppants. This material in addition to providing this greater fracture flow capacity, has other highly desirable characteristics. The material is of uniform graded size and spherical shape. It is resistant to chemical attack by the ordinary corrosion agent to be found in soils and underground structures. Finally, it is of more uniform compression strength and density and does not deteriorate with the formation of undesirable chemical by-products.

The fracture flow capacity is recorded in millidracy feet of flow (md.-ft.). This is a well recognized method in the oil industry of determining the effectiveness of propping agents. It is determined by multiplying the permeability in darcys by the width of the fracture in which the propping agent is placed. High fracture flow capacities mean larger recoveries from the fracture area and is of utmost significance to petroleum and gas recovery.

I have found that I may use as the starting material for the preparation of high strength proppants any of the higher melting heat resisting glasses as well as ordinary soft glasses.

I have found that the glass may be spheroidized by the practice described in the example or by the methods described in my copending application Serial No. 775,547 filed November 21, 1958, now Patent Number 3,148,045, or by any other method of spheroidizing such as by striking a molten bath with a rotating disc, passing the molten glass through a screen, blowing from a bath, aspirating from a stream or pool, which will permit the glass to be discharged as a sphere at the high temperature here contemplated into a quenching media here disclosed.

I have found that water alone cannot be used as the quench at any temperature within the practice of my invention. Apparently, the high temperatures from which quenching must be carried out in order to achieve my results cause excessive strains when the material is quenched in water or for some reason the water fails to properly remove the heat. In any event, all attempts to quench in water have resulted in failure. On the other hand, aqueous solution of water glass, aqueous solution of starch such as cornstarch, aqueous solutions of soap and aqueous solutions or dispersions of certain water soluble organic materials such as ethylene glycol have produced satisfactory quenching.

I have found that such glass proppants as are here described must have a density below about 2.6 gm./cc. in order that they may be properly suspended in conventional fracturing fluids which carry the proppant into the strata which is to be supported. These glass proppants are chemically inert at 250° F. This is necessary in order to prevent their being chemically attacked and eroded by brine and other sub-surface corrosive agents. The pH range encountered in sub-surface strata may vary from about pH 3 to pH 11 and the proppant must be able to withstand such varying conditions. This means that the proppant must be chemically stable in both acid and alkaline environments. Since the bottom hole temperatures of oil and gas wells may be considerably higher than the surface temperatures the proppant must be physically stable at temperature of up to 250° F. in order to satisfactorily serve as a proppant. In addition, the proppant to be pumpable must have smooth surfaces of generally spherical shape as well as high strength.

In the foregoing specification, I have set out certain preferred practices and embodiments of my invention. However, it will be evident that the invention may otherwise embodied within the scope of the following claims.

I claim:

1. A method of making high strength bodies of glass having a generally spherical shape, comprising the steps of heating said glass body to a temperature above its softening point and introducing said heated body at a temperature above its softening point into a quenching fluid.

2. A method of making high strength bodies of glass having a generally spherical shape, comprising the steps of heating particles of glass in a moving bed of carbonaceous material of low chemical reactivity, maintaining the moving bed at a temperature above the softening point of the glass under atmospheric conditions that permit no susbtantial combustion of the carbonaceous material to cause particle surface conditions of incipient fusion and introducing said heated particles at a temperature above their softening point in a fluid into a fluid quench at ordinary room temperatures which fluid has a viscosity greater than water.

3. A method as claimed in claim 1 wherein the quenching fluid is an oleaginous fluid.

4. A method as claimed in claim 1 wherein the quenching fluid is ethylene glycol.

5. A method as claimed in claim 1 wherein the quenching fluid is an aqueous starch solution.

6. An article made according to the method of claim 1 which is characterized by a compressive strength in excess of 50,000 lbs./in.$^2$ and by resistance to chemical attack at temperatures of about 250° F.

References Cited by the Examiner

UNITED STATES PATENTS

| 1,596,105 | 8/1926 | Kelly | 161—1 |
| 2,460,977 | 2/1949 | Davis et al. | 65—21 |
| 2,919,471 | 1/1960 | Hechinger | 18—47.2 |
| 2,950,247 | 8/1960 | McGuire et al. | 252—8.55 |
| 2,963,824 | 12/1960 | Pinotti | 65—21 |
| 3,075,581 | 1/1963 | Kern | 166—42 |
| 3,081,209 | 3/1963 | Chan et al. | 161—1 |
| 3,149,016 | 9/1964 | Tung | 161—1 |

FOREIGN PATENTS 4,372   12/1874   Great Britain.

OTHER REFERENCES

Handbook of Glass Manufacture, vol. I, ed. by F. V. Tooley, 1953, Odgen Pub. Co., New York, pp. 23–25 relied on.

DONALL H. SYLVESTER, *Primary Examiner.*

JOSEPH REBOLD, *Examiner.*